United States Patent
Inukai

(10) Patent No.: US 8,289,356 B2
(45) Date of Patent: Oct. 16, 2012

(54) LIGHT OUTPUT DEVICE AND IMAGE FORMING APPARATUS INCLUDING THE SAME

(75) Inventor: Katsumi Inukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 391 days.

(21) Appl. No.: 12/712,646

(22) Filed: Feb. 25, 2010

(65) Prior Publication Data
US 2010/0221027 A1 Sep. 2, 2010

(30) Foreign Application Priority Data

Mar. 2, 2009 (JP) .................. 2009-048481

(51) Int. Cl.
B41J 2/435 (2006.01)
G03G 15/043 (2006.01)
(52) U.S. Cl. .......................... 347/236; 399/51
(58) Field of Classification Search .................. 347/236; 399/51; 315/307; 372/38.02; 345/82; 323/282
See application file for complete search history.

(56) References Cited

U.S. PATENT DOCUMENTS

| | | | |
|---|---|---|---|
| 5,418,806 A | 5/1995 | Araki | |
| 2003/0035451 A1* | 2/2003 | Ishida et al. | 372/38.02 |
| 2003/0213890 A1 | 11/2003 | Mochiduki et al. | |
| 2006/0022916 A1* | 2/2006 | Aiello | 345/82 |
| 2010/0033146 A1* | 2/2010 | Irissou et al. | 323/282 |

FOREIGN PATENT DOCUMENTS

| | | |
|---|---|---|
| JP | 06-164037 A | 10/1994 |
| JP | 2000-052590 | 2/2000 |
| JP | 2001-105657 | 4/2001 |
| JP | 2002-278383 | 9/2002 |
| JP | 2003-305882 | 10/2003 |
| JP | 2004-288869 A | 10/2004 |
| JP | 2005-169785 | 6/2005 |
| JP | 2005169785 * | 6/2005 |
| JP | 2006-017949 | 1/2006 |

OTHER PUBLICATIONS

JP Notification of Reasons for Refusal dated Feb. 2, 2012, corresponding Application No. 2009-048481.

* cited by examiner

*Primary Examiner* — Stephen Meier
*Assistant Examiner* — Carlos A Martinez
(74) *Attorney, Agent, or Firm* — Banner & Witcoff, Ltd.

(57) ABSTRACT

A light output device comprises a controller configured to generate a set signal that sets a reference voltage for determining a predetermined value of an output power of the light in a case of power adjustment wherein the output power is changed to a power different from in a case of power accuracy requirement, and a reference voltage generating section configured to generate the reference voltage according to the set signal. The controller in the case of power accuracy requirement puts a set-signal output port in a high-impedance state, while in the case of power adjustment generates the set signal using a predetermined voltage, the set signal alternating between a high level and a low level. The reference voltage generating section in the case of power accuracy requirement generates the reference voltage on a basis of a level shift voltage generated by level shifting the predetermined voltage.

6 Claims, 5 Drawing Sheets

LIGHT OUTPUT DEVICE AND IMAGE FORMING APPARATUS INCLUDING THE SAME

CROSS REFERENCE TO RELATED APPLICATION

This application claims priority from Japanese Patent Application No. 2009-48481 filed on Mar. 2, 2009. The entire content of this priority application is incorporated herein by reference.

TECHNICAL FIELD

The present invention relates to adjustment of light output of light output devices.

BACKGROUND

A known art generates a reference voltage by smoothing a PWM (pulse width modulation) signal, determines the light amount of a laser diode (LD), and thus adjusts the LD power using the reference voltage.

According to the art, it is conceivable that, in usual use where a higher degree of accuracy in the LD power is required, the LD power is set at a maximum value and, in a case (such as in a toner save mode) where a lower power is required, the PWM (H/L) signal is used. However, with the art, in a case where a power higher than the power in the usual use is required, it is difficult to output the required power. Moreover, while the reference voltage is generated from the PWM signal, there is an error in the high level of the generated PWM signal. This is a potential cause of an undesired LD power.

Thus, there is a need for a device that is capable of switching the power in the usual use to a higher one than the power in the usual use while maintaining the accuracy in the usually used light output power.

SUMMARY

An aspect of the present invention is a light output device including: an output section including a light source and configured to output light from the light source; a feedback-signal generating section configured to generate a feedback control signal to cause an output power of the light to be at a predetermined value and supplies the feedback control signal to the output section; a controller configured to generate a set signal that sets a reference voltage for determining the predetermined value in a case of power adjustment wherein in the case of power adjustment the output power is changed to a power different from in a case of power accuracy requirement and control the output of the output section; a set-signal output port configured to output the generated set signal; and a reference voltage generating section configured to receive the set signal from the set-signal output port and generate the reference voltage according to the set signal. The controller in the case of power accuracy requirement put the set-signal output port in a high-impedance state, while the controller in the case of power adjustment generates the set signal using a predetermined voltage, the set signal alternating between a high level and a low level. The reference voltage generating section in the case of power accuracy requirement generates the reference voltage on a basis of the level shift voltage generated by level shifting the predetermined voltage.

DETAILED DESCRIPTION

<An Illustrative Aspect>

1. Configuration of Image Forming Apparatus

Figure 1:
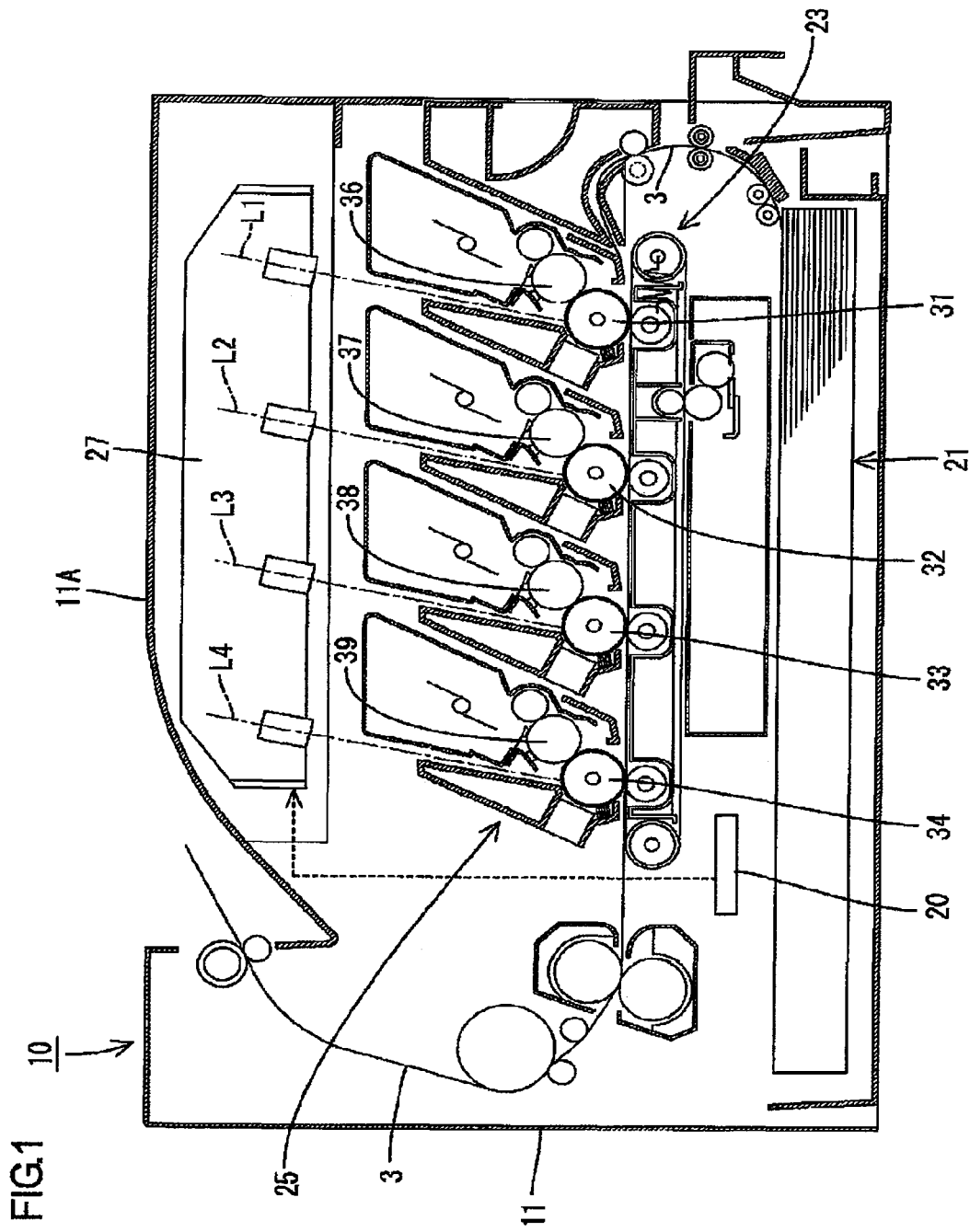
FIG. 1 is a schematic side sectional view of a laser printer of an illustrative aspect in accordance with the present invention.

An illustrative aspect in accordance with the present invention will be described with reference to FIGS. 1 through 5. FIG. 1 is an illustration of the image forming apparatus adopted to a color laser printer 10.

The color laser printer 10 is a color laser printer of a direct tandem type, including four photosensitive body drums 31, 32, 33, 34 and four developer rollers 36, 37, 38, 39 corresponding to respective colors of black, cyan, magenta, and yellow. Note that a "front side" will hereinafter indicate the right side in FIG. 1. Note also that the image forming apparatus is not limited to the color laser printer; the image forming apparatus may be, for example, a monochromatic laser printer or a so-called multi-function machine having a facsimile function and a copy function.

The color laser printer (hereinafter referred to simply as a "printer") 10 includes a box-shaped body casing 11 and, in the body casing 11, a sheet supplying unit 21, a light output device 20, a sheet conveying unit 23, an image forming part 25, and a scanner part 27 that are stacked in that order from below. The sheet conveying unit 23 can convey sheets. The image forming part 25 can form an image using light outputted from the light output device 20. The image forming part 25 includes the photosensitive body drums 31, 32, 33, 34, the developer rollers 36, 37, 38, 39, etc.

Polygon mirrors (not illustrated) and four laser diodes (illustrations of a light source) LD1 to LD4 (not illustrated in the figure) are mounted in the scanner part 27 corresponding to respective colors of black, cyan, magenta, and yellow. The laser diodes LD1 to LD4 are included in the light output device 20. Laser light (an illustration of light) emitted from the laser diodes LD1 to LD4 are deflected by the polygon mirrors. Thereafter, optical members such as reflecting mirrors, which are disposed in the light paths, turn the directions of the light. Surfaces of the photosensitive body drums 31, 32, 33, 34 are irradiated with the light by high-speed scan as illustrated in FIG. 1. Electrostatic latent images are thus formed on the photosensitive body drums 31-34. Thereafter, the sheet (an illustration of a recording medium) 3 is conveyed through a sheet conveying path while undergoing a developing process, a transfer process, and a fixing process so that an image is formed thereon. After the image is formed, the sheet 3 is ejected onto a sheet exit tray provided on a top face 11A of the body casing 11.

The printer 10 has a standard power mode (corresponding to a "case of power accuracy requirement") to perform a normal print process and a toner save mode (an illustration of a "case of power adjustment"). In the toner save mode, a toner use amount is reduced. The printer 10 switches between the standard power mode and the toner save mode while changing output powers of laser light L1 to L4 emitted from the laser diodes LD1 to LD4 by the light output device 20.

2. Configuration of Light Output Device

Figure 2:
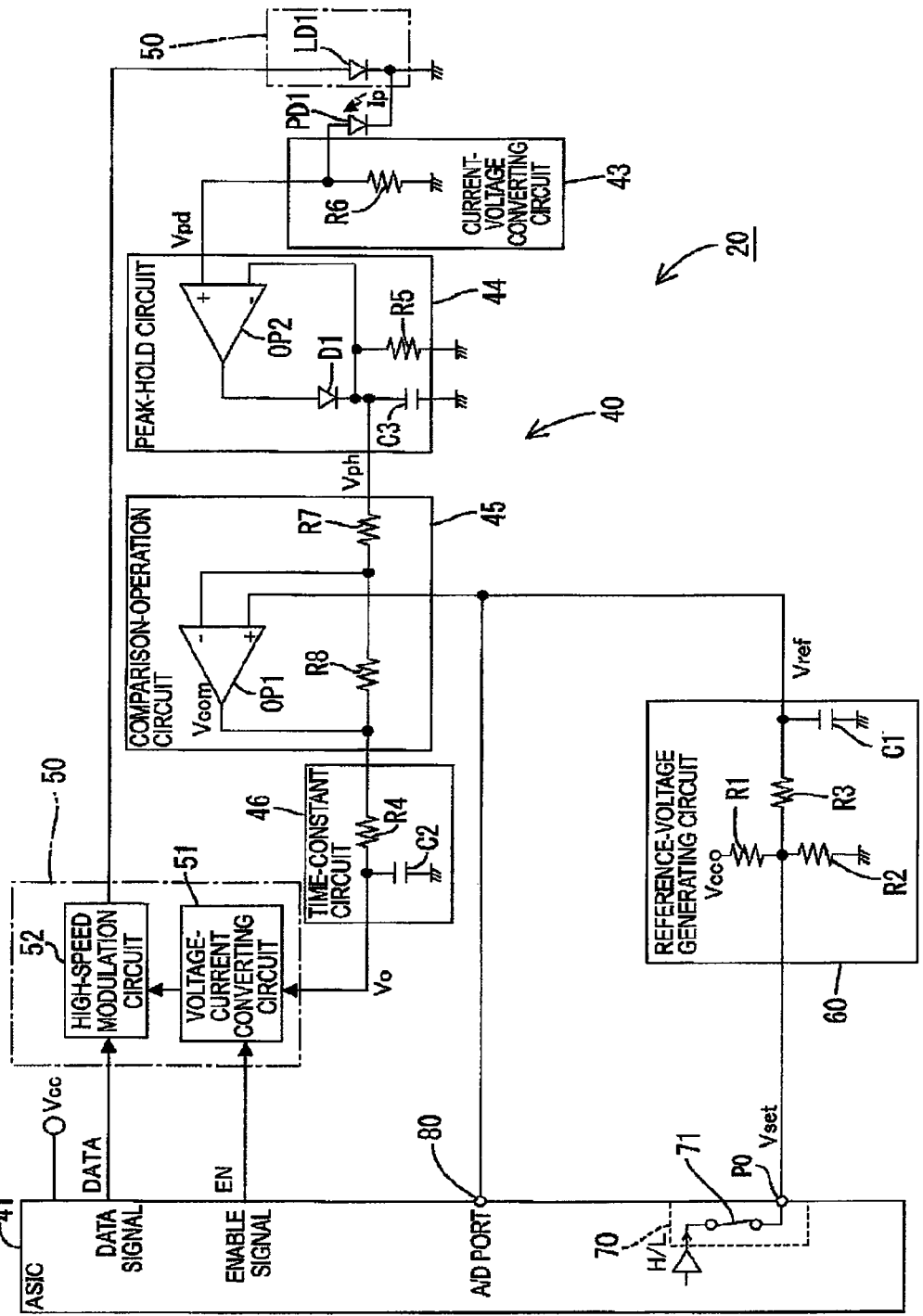
FIG. 2 is a schematic circuit diagram of a light output device.

Next, referring to FIG. 2, a circuit configuration of the light output device 20 of this illustrative aspect will be described. The light output device 20 is illustratively provided in the above-described printer 10 (the illustration of the image forming apparatus). While the circuit of the light output device 20, excepting the control circuit 41, is provided separately for each of the laser diodes LD1 to LD4 of the printer 10, the circuits for the laser diodes LD1 to LD4 have an identical configuration. Accordingly, only the circuit for the laser diode LD1 is illustrated in FIG. 2. In this illustrative aspect, the control circuit (an illustration of a "controller") 41 in accordance with the present invention is provided commonly for the laser diodes LD1 to LD4. Note that the light output device 20 is not limited to the light output device mounted in the printer 10. Likewise, the light source is not limited to the laser diodes LD1 to LD4.

The light output device 20 roughly includes an output section 50, a control circuit 41, a feedback-signal generating section 40, and a reference voltage generating circuit 60.

The output section 50 outputs the laser light L1 from the laser diode LD1. The control circuit 41 controls the output of the output section 50. The feedback-signal generating section 40 generates a feedback control signal Vo to maintain the output power of the laser light L1 at a predetermined value. Furthermore, in order to gradually increase the output power of the laser light L1 upon powering on of the power (voltage) Vcc, the feedback-signal generating section 40 generates the feedback control signal Vo in a gradually increasing manner and supplies the generated feedback control signal Vo to the output section 50.

The configuration of the light output device 20 will hereinafter be described more in details. As illustrated in FIG. 2, the output section 50 includes a voltage-current converting circuit 51, a high-speed modulation circuit 52, and a laser diode LD1.

The feedback-signal generating section 40 includes a light detecting section, a comparison operation circuit 45, and a time-constant circuit 46.

The light detecting section includes a photodiode PD1, a current-voltage converting circuit 43, and a peak-hold circuit 44. The light detecting section venerates light detection signals (Ip, Vpd, Vph) according to the output power of the laser light L1.

The photodiode PD1 receives the laser light from the laser diode LD1, generates the light detection current (signal) Ip according to the magnitude of the light intensity of this laser light, and outputs the light detection current Ip toward the current-voltage converting circuit 43.

The current-voltage converting circuit 43 receives the light detection current Ip, converts the light detection current Ip into the light detection voltage Vpd, and supplies the light detection voltage (signal) Vpd to the peak-hold circuit 44. As illustrated in FIG. 2, the current-voltage converting circuit 43 is configured by, for example, a resistor R6 that is connected between the ground and an anode of the photodiode PD1.

The peak-hold circuit 44 receives the light detection voltage Vpd and holds a peak value thereof for a predetermined time. As illustrated in FIG. 2, the peak-hold circuit 44 includes, for example, an operational amplifier (hereinafter referred to as an "op-amp") OP2 and receives the light detection voltage Vpd at a non-inverting input terminal. An output terminal of the op-amp OP2 is connected to an anode of the diode D1. A cathode of the diode D1 is connected to an inverting input terminal of the op-amp OP2. The cathode of the diode D1 is connected also to a capacitor C3 and a resistor R5. Thus, while the capacitor C3 is being charged, the peak value of the light detection voltage Vpd is held in the terminal of the capacitor C3 connected to the cathode of the diode D1 so that the hold voltage (signal) Vph is formed. The hold voltage Vph is supplied to the comparison operation circuit 45.

In this illustrative aspect, the control circuit 41 is configured by, for example, an ASIC (application specific integrated circuit). In order to control the output of the output section 50, the control circuit 41 generates an output power set signal (hereinafter referred to simply as a "set signal") Vset for setting the reference voltage Vref and supplies the set signal Vset to the reference voltage generating circuit 60. Note here that the set signal Vset is a PWM (pulse width modulation) signal. When the pulse width of the PWM signal is set at a predetermined value, the reference voltage Vref of the reference voltage generating circuit 60 is set, and the output power of the laser diode LD1 is set.

The control circuit 41 further includes a set-signal output port 70 for outputting the set signal Vset. As illustrated in FIG. 2, the set-signal output port 70 includes, for example, a switch circuit 71 and a port terminal Po. In the case of power accuracy requirement such as the standard power mode (in a normal case), the switch circuit 71 is turned off so that the set-signal output port 70 is put in a high-impedance (HiZ) state. Then, the set signal Vset is generated by dividing the power voltage Vcc with the resistors R1 and R2 of the reference voltage generating circuit 60. That is, the power voltage Vcc (an illustration of a "predetermined voltage") is level shifted so that a level shift voltage is generated, and the reference voltage Vref is generated on a basis of the level shift voltage.

On the other hand, in the case of power adjustment such as the toner save mode, the switch circuit 71 is turned on. Then, the set signal Vset is generated as the PWM signal having a predetermined duty ratio (hereinafter referred to simply as a "DUTY"). That is, the set signal Vset alternating between H (a high level) and L (a low level) is generated. Then, the reference voltage generating circuit 60 smoothes the PWM signal and thus generates the reference voltage Vref.

The control circuit 41 further includes an A/D port (an illustration of a detecting section) 80 for receiving the reference voltage Vref and detecting the reference voltage Vref. The A/D port 80 includes an analog-to-digital conversion circuit (not illustrated in the figure) etc. The A/D port 80 converts the analogue reference voltage Vref to the digital reference voltage Vref.

The reference voltage generating circuit 60 receives the set signal Vset, increases the set signal Vset in a gradual manner by a predetermined time constant, and thus generates the reference voltage Vref. That is, the reference voltage Vref is generated by smoothing the set signal Vset. The reference voltage Vref is supplied to the comparison operation circuit 45. The reference voltage generating circuit 60 includes, for example, three resistors R1, R2, and R3, and a capacitor C1 as illustrated in FIG. 2.

The comparison operation circuit 45 compares the hold voltage (a voltage of the light detection signal) Vph and the reference voltage Vref and, according to a difference therebetween, generates a comparison signal Vcom. Specifically, when the reference voltage Vref is larger than the hold voltage Vph, the comparison-operation circuit 45 generates the comparison signal Vcom that increases the output power of the laser light. The comparison signal Vcom is supplied to the time-constant circuit 46. The comparison-operation circuit 45 includes, for example, an op-amp OP1, a resistor R7, and a resistor R8 as illustrated in FIG. 2. The hold voltage Vph is supplied to an inverting input terminal of the op-amp OP1 via the resistor R7, and the reference voltage Vref is supplied to a non-inverting input terminal of the op-amp OP1. The amplification degree of the op-amp OP1 is set with the resistor R7 and the resistor R8.

As illustrated in FIG. 2, the time-constant circuit 46 includes a resistor R4 and a capacitor C2 that provide a predetermined time constant. The time-constant circuit 46 receives the comparison signal Vcom from the comparison operation circuit 45, increases the comparison signal Vcom in a gradual manner by the predetermined time constant (=R4*C2), and thus generates the feedback control signal Vo. The feed back control signal Vo is supplied to the output section 50 or, specifically, to the voltage-current converting circuit 51 of the output section 50.

3. Generation of Set Signal (Reference Voltage)

Figure 3:
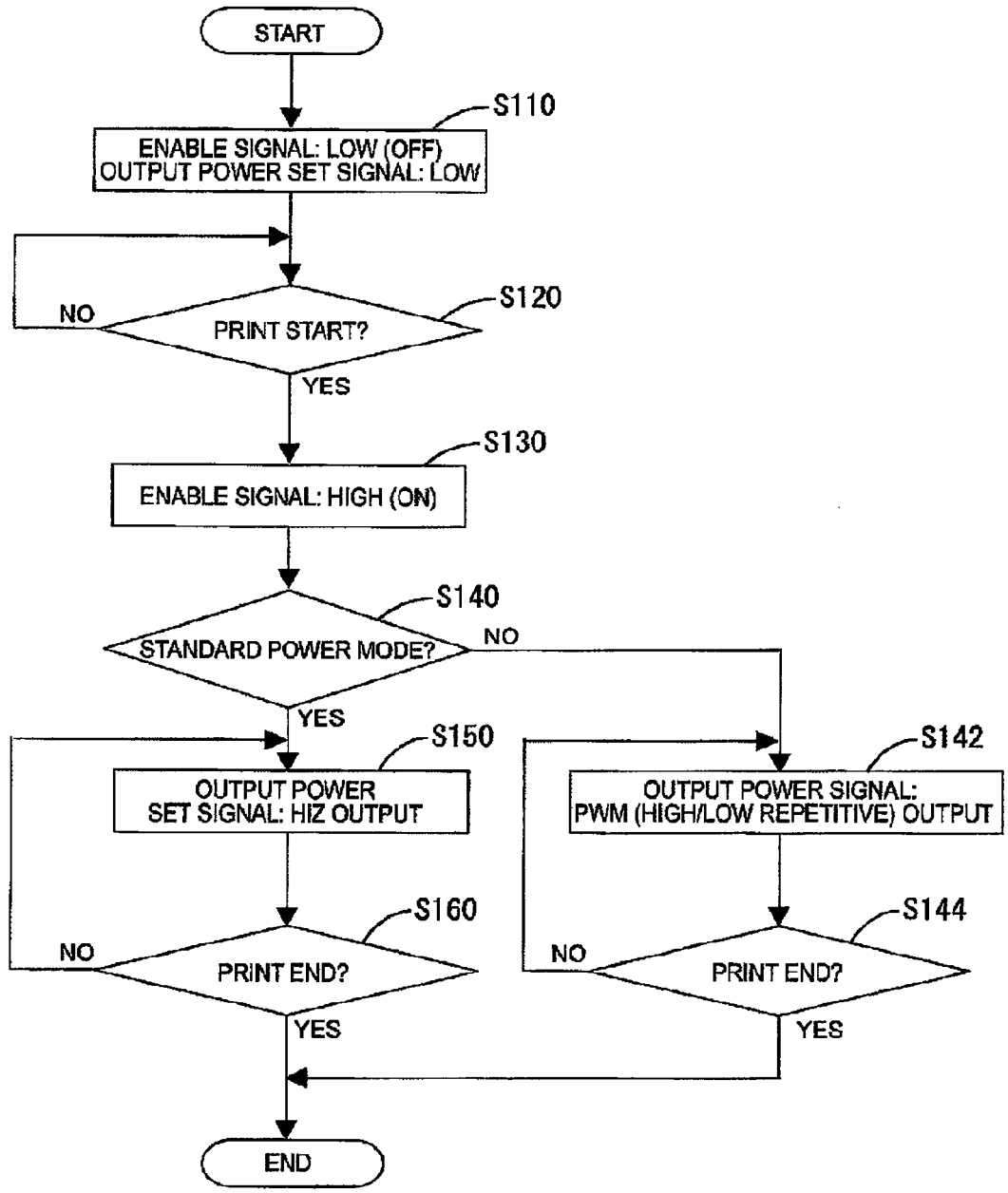
FIG. 3 is a flowchart illustrating a process of generating a set signal.

Next, generation of the set signal Vset by the light output device 20 configured as described above will be described with reference to FIG. 3. FIG. 3 is a flowchart illustrating a process of generating the set signal (the PWM signal) Vset. The control circuit 41 executes the process illustrated in FIG. 3 in accordance with a program. The control circuit 41 starts to execute the process at, for example, powering on of the printer 10 and repetitively executes the process while the power is being applied to the printer 10.

In a state where there is no printing instruction to the printer 10, the control circuit 41 sets an enable signal EN and the set signal Vset into a low state as illustrated in step S110 of FIG. 3. Next, at receipt of the printing instruction by the printer 10, the control circuit 41 determines in step S120 whether to start printing. In a case of printing start, the control circuit 41 turns the enable signal EN to a high state in step S130 so that the voltage-current converting circuit 51 is in the operating state.

Next, in step S140, the control circuit 41 determines whether the present printing mode is the standard power mode. If the present printing mode is determined to be the standard power mode (the case of power accuracy requirement), the process goes to step S150 so that the set-signal output port 70 is put in the high-impedance state as described above. Then, the set signal Vset is generated by dividing the power voltage Vcc with the resistors R1 and R2 of the reference voltage generating circuit 60. That is, in the standard power mode, the power voltage Vcc is level shifted by the resistors R1 and R2 so that the level shift voltage is generated, and the reference voltage Vref is generated on the basis of the level shift voltage.

Then, the process of the step S150 is repeated until the printing process terminates (step S160).

On the other hand, if the control circuit 41 determines in the step S140 that the present printing mode is not the standard power mode (the case of power accuracy requirement), i.e. that the present printing mode is the case of power adjustment such as the toner save mode, the process goes to step S142 so that the set signal Vset, which is the PWM signal that repeats H/L by the predetermined DUTY as described above, is generated. Then, the process of the step S142 is repeated until the printing process terminates (step S144).

Thus, in this illustrative aspect, in the case of power accuracy requirement such as normal use where power accuracy is required, the reference voltage Vref is generated on the basis of the certain level shift voltage generated by level shifting the power voltage Vcc with the resistors R1 and R2. On the other hand, in the case of power adjustment such as the toner save mode, the desired reference voltage Vref is generated from the set signal Vset (alternating between the high level and the low level) such as the PWM signal generated using the predetermined voltage such as the power voltage Vcc.

At this time, the high level of the PWM signal is substantially equal to the power voltage Vcc and is larger than the level shift voltage. Accordingly, setting the duty ratio of the PWM signal at, for example, 100% can provide the reference voltage Vref larger than the reference voltage in the case of normal use. Thus, the configuration as described above makes it possible to, while maintaining the accuracy the light output power used in the case of power accuracy requirement (such as the case of normal use) where the power accuracy is required, switch the power so as to be larger than usual.

4. DUTY Correction of Set Signal (PWM Signal)

Figure 4:
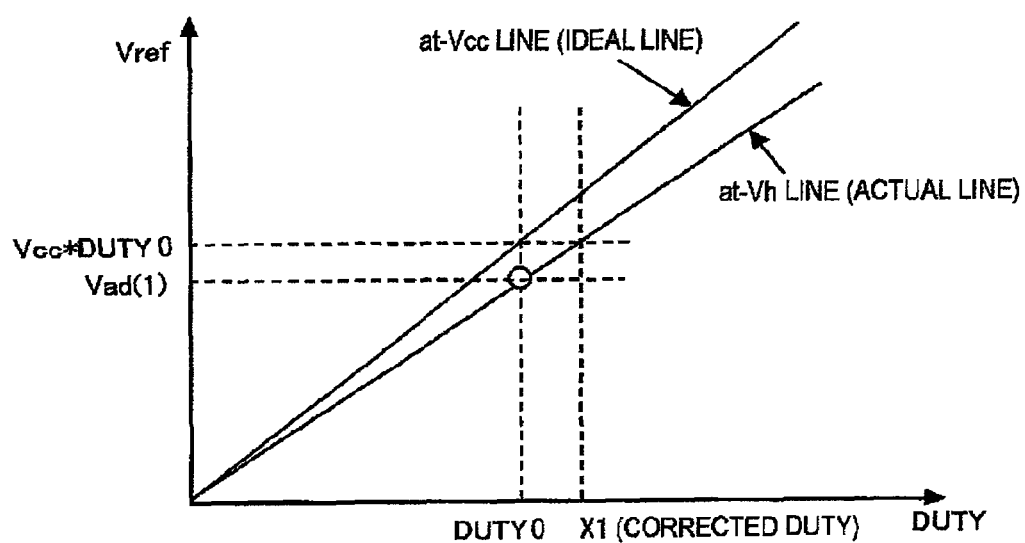
FIG. 4 is a graph illustrating a relation between DUTY and a reference voltage Vref.
Figure 5:
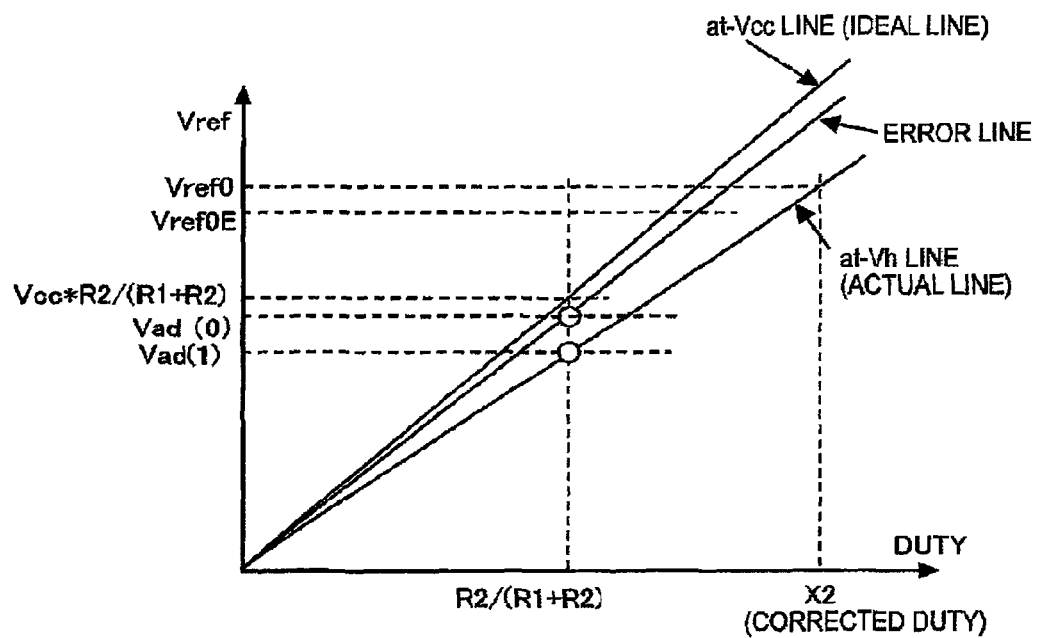
FIG. 5 is a graph illustrating relation between the DUTY and the reference voltage Vref.

Next, DUTY correction of the set signal (the PWM signal) Vset will be described with reference to FIGS. 4 and 5. Each of FIGS. 4 and 5 is a graph illustrating a relation between the DUTY of the set signal (the PWM signal) Vset and the reference voltage Vref. The DUTY and the reference voltage Vref (the output power of the laser light) are in proportion to each other, so that the relation between the DUTY and the reference voltage Vref is represented by a line.

In this illustrative aspect, the control circuit 41 changes the laser light output power from the power for the standard power mode (the case of power accuracy requirement) to a target power for the case of power adjustment such as the toner save mode. Along with this power change, the control circuit 41 changes the DUTY of the set signal Vset so that a value of the reference voltage Vref detected by the A/D port 80 is substantially equal to a target referent voltage that corresponds to the target power.

While changing the DUTY of the set signal Vset, the control circuit (an illustration of a "calculating section") 41 corrects the DUTY on an at-Vh line (corresponding to an "actual line") using an at-Vcc line (corresponding to a "theoretical line, or an ideal line") and thus calculates a corrected DUTY. Note that the at-Vh line (the actual line) represents the actual relation between the DUTY and the reference voltage Vref, which is based on a high-level voltage Vh of the set signal Vset actually outputted from the port terminal Po; and the at-Vcc line (the theoretical line) represents the relation between the DUTY and the reference voltage Vref on a supposition that the high-level voltage Vh of the set signal Vset is equal to the power voltage Vcc.

In other words, the at-Vcc line represents a relation between the DUTY of the set signal Vset and the reference voltage Vref in a case of supposition that a high-level voltage of the PWM signal has a value equal to a value of the power voltage Vcc; and the at-Vh line represents a relation between the DUTY of the set signal Vset and the reference voltage Vref in a case of an actual high-level voltage value Vh.

Furthermore, the actual high-level voltage value Vh of the PWM signal and the reference voltage Vref (a smoothed value of the PWM signal) substantially are related by a following formula: Vref=Vh*DUTY. Note that, in the case where the high-level voltage value Vh is equal to the power voltage Vcc (i.e. is ideal), the reference voltage Vref is substantially as follows:

$$Vref = Vcc * DUTY \qquad \text{Formula 1}$$

On the other hand, in the case where the set-signal output port 70 is put in the high-impedance state, i.e. in the case where the reference voltage Vref is generated by level shifting the power voltage Vcc, the reference voltage Vref is as follows:

$$Vref = Vcc * (R2/(R1+R2)) \qquad \text{Formula 2}$$

Two illustrative options in calculating the corrected DUTY will be hereinafter described.

4-1. First Method of Correction

A first method of correcting the DUTY of the set signal Vset will be described with reference to FIG. 4.

In the first method, the control circuit 41 calculates the corrected DUTY using a reference voltage Vad(1) (corresponding to a "first detection reference voltage") and the target reference voltage. The reference voltage Vad(1) is on the at-Vh line (the actual line) and is detected with a DUTY of the set signal Vset corresponding to the target reference voltage (Vcc*DUTY0) on the at-Vcc line (the theoretical line).

That is, in this correction, as illustrated in FIG. 4, in order to calculate the DUTY (a corrected DUTY) to obtain the predetermined target reference voltage (Vcc*DUTY0), first, the control circuit 41 sets the DUTY at the DUTY0 on the at-Vcc line corresponding to the target reference voltage (Vcc*DUTY0). Then, the control circuit 41 detects the reference voltage Vad(1) that is in the case where the DUTY is the DUTY0. Finally, the control circuit 41 calculates the corrected DUTY using the value of the detected reference value Vad(1) and the target reference voltage (Vcc*DUTY0) in a manner as follows.

Where X1 denotes the corrected DUTY to be calculated, a relation represented by Formula 3 as follows applies from the slope of the at-Vh line.

$$Vad(1)/DUTY0=(Vcc*DUTY0)/X1 \qquad \text{Formula 3}$$

The Formula 3 can be deformed into Formula 4 as follows:

$$X1 \text{(the corrected DUTY)}=(Vcc*(DUTY0)^2)/Vad(1) \qquad \text{Formula 4}$$

The corrected DUTY is thus calculated.

With this method, even in the case where the high-level Vh of the set signal (the PWM signal) Vset is expected to be the power voltage Vcc though the high level Vh actually outputted from the port terminal Po of the set-signal output port 70 is not equal to the power voltage Vcc, the DUTY is corrected, so that the desired output power can be obtained.

Moreover, the corrected DUTY can suitably be calculated from the relation between the theoretical line and the actual line simply by detecting the reference voltage Vad(1) (the first detection reference voltage).

4-2. Second Correcting Option

Next, a second correcting option for the DUTY will be described with reference to FIG. 5.

In the second method of correction includes, in addition to correction of the DUTY due to an error of the high-level voltage Vh of the set-signal output port 70, correction of the DUTY due to the error of the power voltage Vcc is performed. For this purpose, the control circuit 41 calculates a corrected duty ratio (X2) using a reference voltage Vad(0) (corresponding to a "second detection reference voltage") and a reference voltage Vad(1) (corresponding to a "third detection reference voltage"). The reference voltage Vad(0) is detected in the high-impedance state of the set-signal output port 70. The reference voltage Vad(1) is on the at-Vh line (the actual line) and is a reference voltage detected at a value where the DUTY of the set signal Vset corresponds to a rate of the level shift.

Specifically, in a case of the target reference voltage for changing the output power of the laser light denoted by "Vref0" and the DUTY corresponding to the "Vref0" is set, if an error of the power voltage Vcc between devices is present, the reference voltage actually recognized by the control circuit 41 on the circuit does not become the "Vref0". Note here that a recognized target voltage including the actual error by the control circuit 41 is denoted by "Vref0E". In order to correct the error, the recognized target voltage Vref0E on the circuit is required to be a target reference voltage Vref0. That is, in order to absorb the tolerance of the power voltage Vcc, it is necessary to correct the DUTY to the DUTY whereby the target reference voltage Vref0 can be obtained.

For this purpose, the control circuit 41, first, (4-2-1)

puts the set-signal output port 70 in HiZ and reads the reference voltage Vref (corresponding to a "Vad(0)" in FIG. 5) from the A/D port 80. The reference voltage Vref is generated by level shifting. That is, the level shift voltage (the divided voltage value) in the case of power accuracy requirement based on the actual voltage value (the voltage value including a device miscalculation) of the power voltage Vcc is read.

(4-2-2)

Next, the control circuit 41 puts the set-signal output port 70 in the H/L output (PWM output) and reads the reference voltage Vref (corresponding to Vad(1) in FIG. 5) at DUTY=R2/(R1+R2).

(4-2-3)

Moreover, an ideal reference voltage Vref at DUTY=R2/(R1+R2) is, from the Formula 1,
$$Vref=Vcc*(R2/(R1+R2)) \qquad \text{Formula 5.}$$

From the relation between a at-Vcc line and an error line of FIG. 5, a relation of the following Formula 6 applies between the target reference voltage Vref0 and the recognized target voltage Vref0E. Note here that the error line is a line representing a relation between the DUTY (the level shift voltage) and the reference voltage Vref in a case where a reading error due to the Vcc error etc. is present. In other words, the error line is a line representing a relation between the DUTY (level shift voltage) based on the actual power voltage of the device and the reference voltage Vref.

$$Vref0:Vref0E=Vcc*(R2/(R1+R2)):Vad(0) \qquad \text{Formula 6}$$

From the Formula 6, the target reference voltage Vref0 is as follows:

$$Vref0=Vref0E*Vcc*(R2/(R1+R2))/Vad(0) \qquad \text{Formula 7.}$$

(4-2-4)

Where the corrected DUTY to be calculated at the target reference voltage Vref0 is denoted by X2, a relation of Formula 8 as follows applies from the relation of the at-Vcc line and the at-Vh line of FIG. 5:

$$X2:R2/(R1+R2)=Vref0:Vad(1) \qquad \text{Formula 8}$$

From the Formula 8, the corrected DUTY is $$X2\text{(corrected DUTY)}=(R2/(R1+R2))*Vref0/Vad(1) \qquad \text{Formula 9.}$$

When the Formula 7 is substituted in the Formula 9, the calculated corrected DUTY (X2) becomes $$X2\text{(corrected DUTY)}=(R2/(R1+R2))^2*Vref0E*Vcc/(Vad(0)*Vad(1)) \qquad \text{Formula 10.}$$

As described above, in the second method of correction, when changing the reference voltage Vref to the target reference voltage Vref to change the output power of the laser light, the corrected DUTY considering the error on circuits (the error of the power voltage) is calculated. Therefore, the error of the high-level voltage Vh and, in addition, the error on circuits, i.e. the power voltage error between the devices, can be absorbed, so that the error of the output power between the devices can be reduced.

Note that the method to be applied may be selected out of the first method and the second method depending on required conditions such as the accuracy in setting the target power. For example, in a case where a calculation speed etc.

is required rather than the accuracy, the first correcting method will be selected. On the other hand, in a case of power change (such as a case of obtaining the target power larger than the power in the case of power accuracy requirement) that requires the accuracy, or in a case of reducing the error of the output power between the devices, the second method will be suitable.

Other Embodiments

The present is not limited to the illustrative aspect described above with reference to the drawings. Illustrative aspects such as follows are also included within the scope of the present invention. Further various variations other than the following illustrative aspects are also possible within the scope of the invention.

(1) In the above illustrative aspect, the control circuit 41 in the case of power adjustment generates the set signal Vset by switching the output of the set signal output port 70 to H/L. The present invention is not limited to this. The control circuit 41 in the case of power adjustment may generate the set signal Vset on the high level by putting the set-signal output port in the high-impedance state so that the high level is the level shift voltage generated by the resistors R1 and R2. In this case, the low level of the set signal Vset in this case will be supplied from the set signal output port 70 by turning on the switch circuit 71 of the set signal output port 70.

In this case (in the case of HiZ/L switch), the light output power can be adjusted more accurately than in the case of generating the reference voltage Vref from the set signal generated by switching H/L in accordance with the normal predetermined duty ratio. For example, in a case of adjusting the light output power with the power voltage (the output port voltage) Vcc of 3.3 V and the reference voltage Vref of 1 (one) V and in a range of equal to or lower than 1 (one) V, the duty ratio only up to one third (33%) can be used in the case of H/L switch. On the other hand, in the case of HiZ/L switch, by setting such that DUTY 100%=1 (one) V, the range of the usable duty ratio is widened up to 100%, so that the resolution increases. Thus, the Vref, i.e. the light output power, can be more accurately adjusted.

(2) The configuration of the set-signal output port 70 is not limited to the configuration illustrated in FIG. 2. For example, the set-signal output port 70 may include a three-state buffer. That is, it is only necessary for the configuration to be capable of switching between the normal output state and the high-impedance state or capable of switching between the high-impedance state and the low level on a predetermined cycle.

What is claimed is:

1. A light output device comprising:
   an output section including a light source and configured to output light from the light source;
   a feedback-signal generating section configured to generate a feedback control signal to cause an output power of the light to be at a predetermined value and to supply the feedback control signal to the output section;
   a controller configured to generate a set signal that sets a reference voltage for determining the predetermined value in a case of power adjustment wherein in the case of power adjustment the output power is changed to a power different from a power in a case of power accuracy requirement and to control the output of the output section;
   a set-signal output port configured to output the generated set signal;
   a reference voltage generating section configured to receive the set signal from the set-signal output port and generate the reference voltage according to the set signal; and
   a detecting section configured to detect the reference voltage,
   wherein:
   the controller, in the case of power accuracy requirement, puts the set-signal output port in a high-impedance state, while the controller, in the case of power adjustment, generates the set signal using a predetermined voltage, the set signal alternating between a high level and a low level;
   the reference voltage generating section in the case of power accuracy requirement, generates the reference voltage on a basis of a level shift voltage generated by level shifting the predetermined voltage; and
   in a case of changing the output power from a power in the case of power accuracy requirement to a target power in the case of power adjustment, the controller changes a duty ratio of the set signal so that a detection value of the reference voltage by the detecting section is a target reference voltage corresponding to the target power.

2. The light output device according to claim 1, wherein:
   in a case of generating the set signal at the high level in the case of power adjustment, the controller puts the set-signal output port in the high-impedance state and causes the level shift voltage to be the high level.

3. The light output device according to claim 1, further comprising a calculating section, wherein:
   in a case of changing the duty ratio of the set signal, the calculating section corrects the duty ratio on an actual line using a theoretical line and calculates a corrected duty ratio, the actual line representing a relation between the duty ratio and the reference value in a case where the high level of the set signal is an actual high-level voltage, and the theoretical line representing a relation between the duty ratio and the reference voltage in a case where the high level of the set signal is equal to the power voltage.

4. The light output device according to claim 3, wherein:
   the calculating section calculates the corrected duty ratio using a first detection reference and the target reference voltage, the first detection reference voltage being on the actual line and being detected at the duty ratio of the set signal on the theoretical line corresponding to the target reference voltage.

5. The light output device according to claim 3, wherein:
   the calculating section calculates the corrected duty ratio using a second detection reference voltage and a third detection reference voltage, the second detection reference voltage being detected in the high-impedance state of the set signal output port, the third detection reference voltage being on the actual line and being detected at a value of the duty ratio where the duty ratio of the set signal corresponds to a rate of the level shift.

6. An image forming apparatus comprising:
   a light output device according to claim 1; and
   an image forming unit configured to form an image on a recording medium using the light outputted from the output section of the light output device.

* * * * *